July 22, 1958

A. L. NIELSEN 2,844,678

SUMP PUMP SYSTEM

Filed April 20, 1953

INVENTOR.
AXEL L. NIELSEN
BY Whittemore,
Hulbert & Belknap
ATTORNEYS

July 22, 1958

A. L. NIELSEN 2,844,678

SUMP PUMP SYSTEM

Filed April 20, 1953

INVENTOR.
AXEL L. NIELSEN
BY Whittemore,
Hulbert & Belknap
ATTORNEYS ns Patent Office 2,844,678
Patented July 22, 1958

2,844,678

SUMP PUMP SYSTEM

Axel L. Nielsen, Hazel Park, Mich.

Application April 20, 1953, Serial No. 349,911

2 Claims. (Cl. 200—81.5)

The present invention relates to a sump pump system and more particularly to a device for controlling the operation of the motor of a sump pump to periodically empty the sump.

It is an object of the present invention to provide a control device for a sump pump motor operable in response to collection of a predetermined amount of water in the sump to initiate operation of the pump and to continue operation of the pump until all or a predetermined amount of water in the sump has been pumped out.

More specifically, it is an object of the present invention to provide a device including means responsive to the quantity of water in the sump to close a switch to initiate operation of a sump pump motor, and means responsive to actual pumping operation of the pump to maintain the motor switch closed so long as water remains in the sump.

Still more specifically, it is an object of the present invention to provide a control device for a sump pump including a float to initiate operation of the sump pump motor when the water in the sump reaches a predetermined level, in combination with means responsive to continued pumping operation to keep the pump in operation until it has pumped all of the water out of the sump.

It is a further object of the present invention to provide a device as described in the preceding paragraph in which the means effective to maintain the pump in operation comprises means responsive to liquid pressure in a sump pump discharge line.

It is a further object of the present invention to provide a device as described above in which the means for maintaining the pump in operation comprises means responsive to flow of fluid through a sump discharge line.

It is a further object of the present invention to provide a motor control device for a sump pump motor effective to prevent or terminate operation of the motor when the liquid pumped is at a higher than predetermined temperature.

Other objects and features of the invention will become apparent as the description proceeds, especially when taken in conjunction with the accompanying drawings, wherein.

Figure 1:
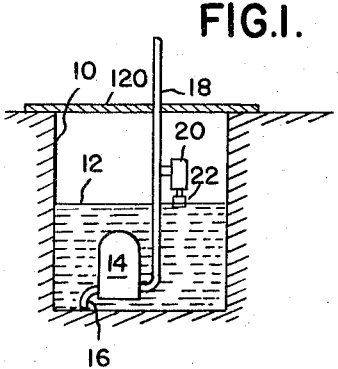
Figure 1 is a diagrammatic view of a sump pump and motor combination and a control device therefor.

Referring now to Figure 1 there is illustrated a sump 10 adapted to collect water or other liquid 12 and having a sump pump-motor unit 14 located in the sump. The unit 14 includes an inlet or suction connection 16 adapted to draw water from adjacent the bottom of the sump and is connected to a discharge line 18. The sump pump control device is indicated generally at 20 and is connected to the discharge line at a point such that a float 22 carried thereby will be raised when the liquid in the sump reaches a predetermined level, thus initiating operation of the sump pump.

Figure 2:
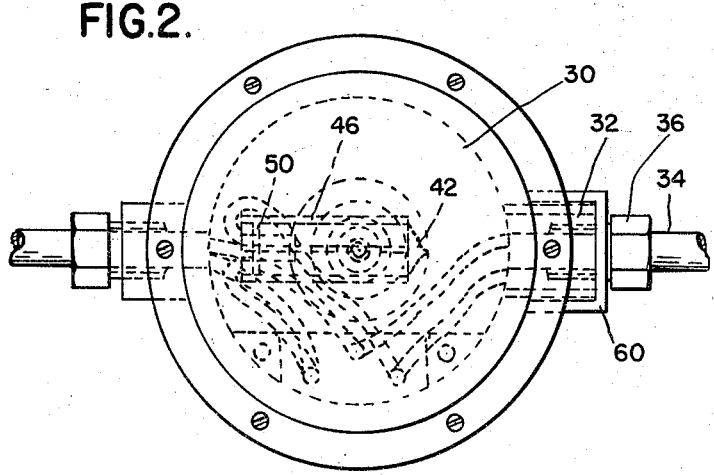
Figure 2 is a plan view of a sump pump motor control device.
Figure 2:
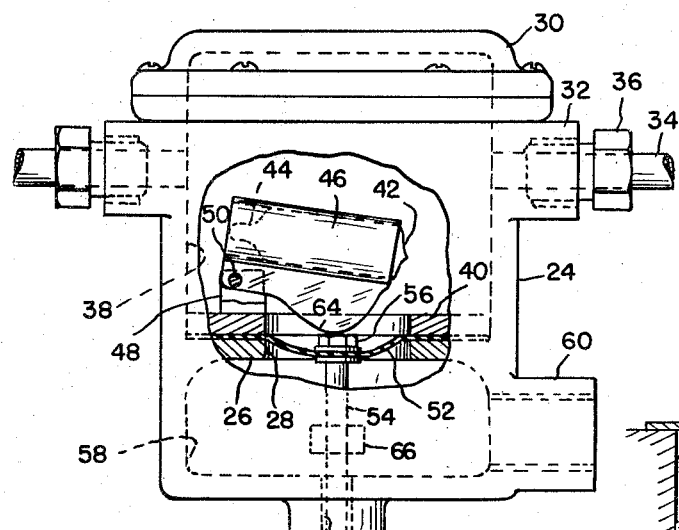
Figure 3:
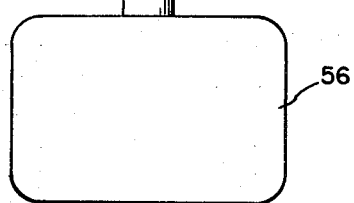
Figure 3 is a side elevation of the device shown in Figure 2, with parts in section.

Referring now to Figures 2 and 3 a sump pump control device is illustrated in detail. The device comprises a casting 24 provided with a partition 26 extending partly across the interior thereof and an opening 28 formed in the partition. The casting 24 is provided with a removable cover 30 and has outwardly projecting bosses 32 which are provided with openings for the reception of electric conductors 34. Suitable sealing means for sealing the openings through the bosses 32 are provided and are indicated at 36.

Above the partition 26 is a switch chamber 38 and mounted on an apertured plate 40 is a motor control switch 42 herein illustrated as of the mercury type. The switch 42 is provided with contacts (not shown) at one end 44 thereof and when tilted counterclockwise from the position illustrated in Figure 3, mercury flows to the end 44 of the switch and closes a circuit through the contactor. The bulb of the mercury switch 42 is supported in a sheet metal member 46, the ends of which are brought together in abutting surface-to-surface contact. The plate 40 is provided with upwardly extending ears 48 and the switch is pivoted thereto by a pin indicated at 50. As is apparent from Figure 3, the switch assembly is biased by gravity to swing in a clockwise direction, which corresponds to the open position of the switch.

Intermediate the mounting plate 40 and the partition 26 is a flexible diaphragm 52. Connected to the diaphragm 52 is the stem 54 of a float 56. The stem is illustrated as extending through a central opening in the diaphragm and is secured thereto by a nut 56 or the like, which may be threaded to the upper end of the stem.

The space 58 within the casting below the partition 26 may be regarded as a liquid chamber and includes an extension 60 by means of which it may be connected to the vertical discharge pipe 18 from the sump pump. Thus, the interior of the chamber 58 is subjected to the pressure of the liquid as discharged by the pump. The stem 54 extends downwardly through an opening 62 which is somewhat larger than the stem so as to permit a restricted flow of liquid through the opening 62. This insures that the liquid chamber 58 will remain filled with liquid.

It will be recalled that the switch chamber 38 was sealed and suitable means are provided for insuring a pneumatic sealing of the switch chamber. Accordingly, pressure of air within the switch chamber which is normally at atmospheric pressure will be increased if heated and will tend to move the diaphragm 52 and hence the float 56 downwardly. Alternatively, the increased pressure of air within the switch chamber due to dangerous high temperature within the sump will prevent upward movement of the diaphragm 52 and starting and/or continued operation of the motor so long as the temperatures remain above a predetermined safe limit.

With the foregoing construction in mind it will be observed that when the water level in the pump reaches the float 56 the float is raised and the upper end of its stem 54 engages a downwardly extending projection 64 on the switch supporting member 46. This has the effect of rocking the mercury switch counterclockwise to on position, thus initiating operation of the electric motor of the sump pump 14. Operation of the motor discharges liquid through the pipe or discharge line 18 and the pressure of the liquid in the pipe 18 is transmitted to the liquid chamber 58 and thence against the side of the diaphragm 52. The area of the diaphragm is correlated to the weight of the float assembly so that the pressure of liquid in the liquid chamber is sufficient to hold the diaphragm in upward position so long as liquid is being pumped through the discharge line 18. However, when the sump has been pumped dry the pump will lose its suction and pressure in the line 18 will drop, thereby permitting the float 56 to move downwardly until a stop 66 thereon engages the bottom of the liquid chamber 58.

The sump pump and motor unit is of the type in which the liquid being pumped is employed for cooling the motor. Accordingly, operation of the motor when the liquid 12 in the sump is at an elevated temperature may damage the motor. Accordingly, the present invention is designed to terminate operation of the motor if the liquid being pumped is at an elevated temperature. This is accomplished as a result of heat transfer from liquid in the liquid chamber 58 to air in the switch chamber 38. When the air in the switch chamber 38 becomes sufficiently heated it urges the diaphragm 52 downwardly against the pressure of the liquid in the chamber 58, thereby terminating operation of the motor. To insure a flow of water through the liquid chamber 58, the opening 62 which receives the float stem 54, is enlarged as previously described, so that there is a continuous restricted flow of liquid therethrough when the pump is operating.

Figure 4:
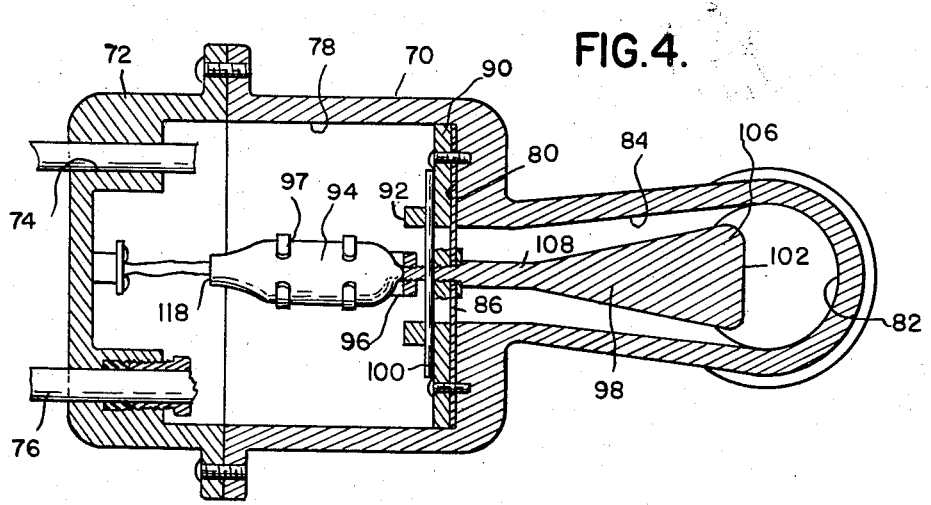
Figure 4 is a horizontal section through a modified form of sump pump control device.
Figure 5:
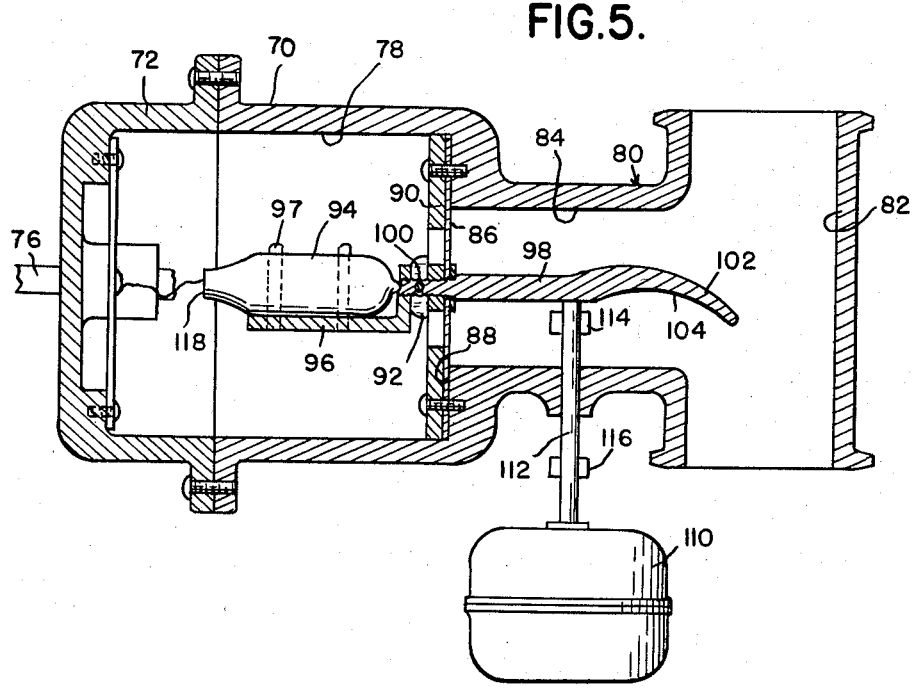
Figure 5 is a vertical section through the control device illustrated in Figure 4.

Referring now to Figures 4 and 5 there is illustrated a modification of the present invention. In this case the device comprises a casing 70 having a removable cap or closure 72 through which are extended openings 74 for the passage of electric conductors 76. The casing member 70 includes a laterally enlarged switch chamber 78 and a T-section indicated generally at 80 which includes a run portion 82 adapted to be connected directly in the discharge line from the sump, and a branch section 84 which communicates with the switch chamber 78. Means are provided for sealing the switch chamber 78 from the T-section 80 and comprises a diaphragm 86 held in position against a shoulder 88 by a plate 90 having upstanding ears 92.

Located within the switch chamber 78 is a switch 94 illustrated as of the mercury type. The switch 94 is carried by a support 96 illustrated as provided with spring clips 97, the support being threaded to an actuating member 98 which is pivoted by a pin 100 extending through openings in the ears 92. The actuating member 98 includes a portion 102 extending out into the run portion of the T-section in position to be impinged by a flow of water through the discharge line. Preferably, the projecting portion 102 of the actuating member 98 is curved as indicated at 104, and the end portion is relatively wide as indicated at 106 in Figure 4, whereas the member tapers to a relatively narrow portion 108 adjacent the frame 86. The device is provided with a float 110 having a stem 112 provided with stops 114 and 116. The upper end of the stem 112 is disposed beneath an intermediate portion of the actuating member 98 so that upward movement of the float 110 from the position illustrated in Figure 5 results in rocking the actuating member 98 counterclockwise and thereby depressing the contact end 118 of the mercury switch 94, thereby closing the contacts to start the sump pump motor. Flow of fluid through the discharge line and through the run section 82 of the unit causes water or liquid to impinge against the actuating member 98 and thereby retain the switch in closed position so long as water continues to flow through the discharge line. When the sump has been pumped dry, no water will flow through the discharge line and the actuating member 98 will drop by gravity to the position corresponding to open circuit position for the switch.

The purpose of the transversely curved section 104 of the actuating member 98 is to provide for a circulation of water within the run section 82 of the T. Thus, so long as water is flowing through the discharge line, dirt or other foreign material is prevented from accumulating in the branch section 84. The tapering shape of the actuating member, as illustrated in Figure 4, provides a complete circulation of water in a counterclockwise direction, as seen in Figure 5, in the branch of the T. More specifically, upward flow of liquid through the vertical portion 82 of the T impinges against the concavely curved lower surface 104 of the relatively wide portion of the actuating member. Some of the water is thereby deflected into the branch 84 of the T at the lower portion thereof. Upward flow of this water past the relatively narrow portion 108 of the actuator takes place and the water flows out above the relatively wide portion 106 into the standpipe or pump discharge line.

It will be observed that in both embodiments of the present invention a switch is provided which is responsive to the presence of a predetermined accumulation of water in a sump to start the motor. Means are provided responsive to continued pumping operation of the pump to keep the pump in operation so long a liquid remains in the sump. In one case the means for keeping the pump in operation comprises pressure responsive means responsive to the pressure of liquid in the discharge line. In the other embodiment of the invention the means for keeping the pump in operation comprises a movable member responsive to flow of fluid in the discharge line, as contrasted with pressure of fluid in such line.

In one embodiment of the invention means are provided responsive to temperature of the pumped liquid to terminate motor operation when the pumped liquid is at a sufficiently high temperature to prevent adequate cooling of the pump motor.

As in the usual case, the sump 10 will normally be provided with a cover indicated at 120 so that if the water in the sump is at an elevated temperature, the air beneath the cover will rapidly assume the same temperature and this temperature will be transmitted to the control device. Under these circumstances if the embodiment of the invention illustrated in Figures 2 and 3 is employed, the elevated temperature of the control device will have increased the pressure within the sealed switch chamber to a point such that it prevents upward movement of the float so long as the water is at a temperature which would result in inadequate cooling of the pump motor.

The present invention comprises a simple construction which may be mounted directly upon the discharge line and includes a portion to be connected into the discharge line. As a result it is therefore possible to locate the control unit at a position somewhat above the maximum level of water in the sump so that the float depending from the unit is in position to be moved when the water in the sump reaches a predetermined level. The control unit is thereby located in a position above the maximum level of water in the sump and is adapted to be connected to the motor and pump unit, which preferably is a complete unit adapted to be located at the bottom of the sump. Obviously, the control unit may be located at the desired level in the discharge line or if it is desired to change the level at which the pump starts to operate without changing the mounting of the control unit, this may be accomplished by suitably extending the float supporting stem.

Both of the present constructions are characterized by their simplicity and their ruggedness. Control devices of this type are expected to operate unfailingly without attention for long periods and complicated constructions are undesirable. The present construction is extremely simple and includes dircet acting mechanism which cannot conceivably fail in operation.

The drawings and the foregoing specification constitute a description of the improved sump pump system in such full, clear, concise and exact terms as to enable any person skilled in the art to practice the invention, the scope of which is indicated by the appended claims.

What I claim as my invention is:

1. A control device for a pump having a discharge line, comprising a movable switch actuator, a float carried by said device in position to be elevated by liquid to be pumped, said float being operatively connected to said actuator to move said actuator in switch closing direction when so elevated, a blade connected to said actuator including a portion adapted to be located in the flow of liquid discharged in said discharge line, said actuator and blade being pivotally mounted relative to said device, and a mercury switch carried by said actuator for movement therewith.

2. A device as defined in claim 1 in which said device comprises a T-fitting inserted in said sump discharge line, and in which said blade is curved to induce a circulation within the branch of said fitting.

References Cited in the file of this patent

UNITED STATES PATENTS

| | | |
|---|---|---|
| 669,037 | Stevens | Feb. 26, 1901 |
| 868,464 | Mann | Oct. 15, 1907 |
| 1,736,198 | Holden | Nov. 19, 1929 |
| 1,984,670 | Williams | Dec. 18, 1934 |
| 1,985,659 | Hickstein | Dec. 25, 1934 |
| 2,625,107 | Schaefer | Jan. 13, 1953 |
| 2,635,546 | Enyeart et al. | Apr. 21, 1953 |
| 2,680,168 | Murphy | June 1, 1954 |
| 2,730,591 | Nielsen | Jan. 10, 1956 |
| 2,787,960 | Wightman | Apr. 9, 1957 |